(No Model.)

C. L. POND.
METALLIC SEAL.

No. 329,209. Patented Oct. 27, 1885.

Witnesses:
Theo. L. Popp.
Ott. H. Krotz.

Chas. L. Pond, Inventor.
By Wilhelm Bonner
Attorneys.

UNITED STATES PATENT OFFICE.

CHARLES L. POND, OF BUFFALO, NEW YORK.

METALLIC SEAL.

SPECIFICATION forming part of Letters Patent No. 329,209, dated October 27, 1885.

Application filed September 3, 1884. Serial No. 142,133. (No model.)

*To all whom it may concern:*

Be it known that I, CHARLES L. POND, of the city of Buffalo, in the county of Erie and State of New York, have invented a new and useful Improvement in Metallic Seals, of which the following is a specification.

This invention relates to an improvement in that class of seals which are employed for securing the doors of freight-cars, and for sealing packages, &c., and which consist of a narrow strip of tin or other suitable metal having its ends provided with means whereby they can be interlocked.

The object of my invention is to construct a seal of this character which can be easily and quickly applied, and the ends of which, when locked together, cannot be stripped or separated and again replaced without being detected.

My invention consists, to these ends, of the improvements in the construction of the seal which will be hereinafter fully described, and pointed out in the claims.

Figure 1:
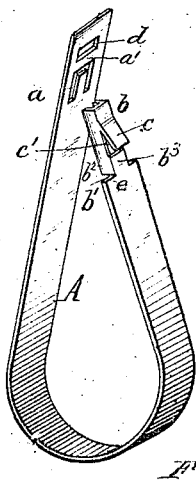
Figure 2:
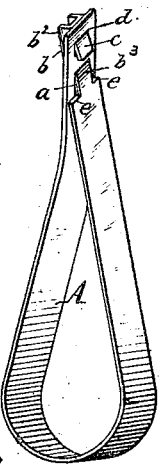
Figure 3:
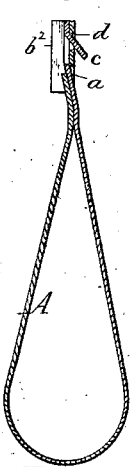
Figure 4:
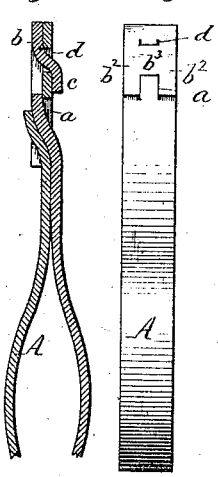
Figure 5:
Figures 6, 8:
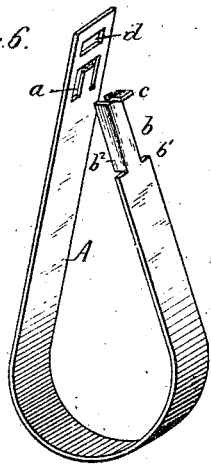
Figure 7:
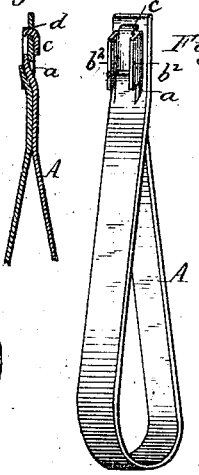
Figure 9:
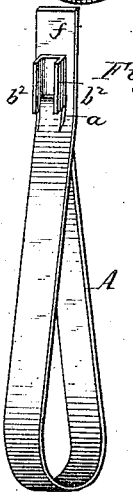
Figure 1:
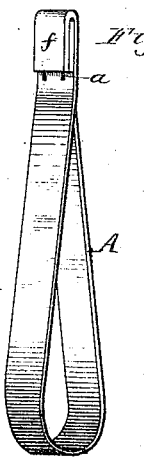

In the accompanying drawings, Figure 1 represents a perspective view of my improved seal with the ends separated. Fig. 2 is a similar view with the threading end inserted through the slot in the opposite end of the strip, preparatory to pressing the same. Fig. 3 is a longitudinal section of the seal with the ends interlocked, but not pressed down. Fig. 4 is a similar view, on an enlarged scale, showing the ends pressed down. Fig. 5 is a face view of the seal after being pressed. Fig. 6 is a perspective view of a modified construction of the seal. Fig. 7 is a similar view of the same seal, showing the ends interlocked and in position to be pressed. Fig. 8 is a longitudinal section of the seal illustrated in Figs. 6 and 7, with the ends pressed down. Figs. 9 and 10 are perspective views of another modified construction of the seal.

Like letters of reference refer to like parts in the several figures.

A represents the body of the seal, which is composed of a narrow strip of tin or similar metal. The strip A is provided near one end with a U-shaped slot, $a$, which is adapted to receive the opposite end, $b$, of the strip, which is made correspondingly U-shaped in cross-section. The threading end $b$ is formed by cutting transverse slits into opposite sides of the strip A, and then bending up the sides $b^2$ of the strip between the cuts $b'$ and the end of the strip, so that the sides $b^2$ will be at right angles, or thereabout, with the center portion, $b^3$, of the strip, thus forming a trough-shaped or channeled threading end. This threading end $b$ is provided on its center portion, $b^3$, with a tongue or lip, $c$, which is formed by cutting a U-shaped slot, $c'$, into the center portion, $b^3$, and raising the lip so formed on the flat back of the trough-shaped threading end. The tongue $c$ is adapted to enter an opening or slot, $d$, formed in the opposite end of the strip A, above the U-shaped slot $a$. The sides of the slot $c'$ whereby the tongue $c$ is formed are preferably recessed or cut into the sides $b^2$, so that when the seal is pressed the portion $a'$ of the strip between the slots $a$ and $d$ will rest in the recesses of the slot $c'$ and permit the tongue $c$ to be pressed flush with the strip. The threading end $b$ is inserted in the U-shaped slot $a$ until the shoulders $e$ of the threading end are brought in line with the center or transverse portion of the slot $a$, and the free end of the tongue $c$ has passed by the transverse slot $d$. By a short backward movement of the threading end $b$ in the slot $a$ the tongue $c$ is caused to engage in the slot $d$, as represented in Figs. 2 and 3. The sides $b^2$ of the threading end $b$ are now bent outwardly and pressed against the outer side of the strip A, and the tongue or lip $c$ against the opposite side of the strip, as represented in Figs. 4 and 5. The pressing of the seal is accomplished by a suitable press. In this manner the ends of the strip are securely interlocked, and cannot be separated or stripped without being detected.

If preferred, the tongue or lip $c$ may be formed at the upper end of the trough-shaped threading end $b$, and passed through the opening $d$ and bent inwardly against the strip A, as shown in Figs. 6, 7, and 8.

The tongue or lip $c$ may be omitted, if preferred, as shown in Figs. 9 and 10, and in this case the slotted end of the strip is formed with an extension, $f$, which is lapped over the sides $b^2$ of the trough-shaped threading end after the sides $b^2$ have been pressed against the strip.

The strip A, with its slots and threading end, is formed at one operation by suitable stamping-dies.

My improved seal is very simple in construction, and can be easily and quickly threaded in the dark.

I claim as my invention—

1. A metallic seal composed of a strip of tin or other suitable metal, provided at one end with a trough-shaped threading end having sides, and at its opposite end with a U-shaped slot adapted to receive the trough-shaped threading end, substantially as set forth.

2. A metallic seal composed of a strip of tin or other suitable metal, provided at one end with a trough-shaped threading end, $b$, having sides $b^2$ and a tongue or lip, $c$, and at its opposite end with a U-shaped slot adapted to receive the trough-shaped threading end $b$, and a slot, $d$, adapted to receive the tongue or lip $c$, substantially as set forth.

3. A metallic seal composed of a strip, A, of tin or other suitable metal, provided at one of its ends with a U-shaped slot, $a$, and having its opposite or threading end provided with a narrow center portion, $b^3$, and sides $b^2$, connected with the center portion, $b^3$, and separated from the main portion of the strip by transverse slits, substantially as set forth.

Witness my hand this 21st day of August, 1884.

CHAS. L. POND.

Witnesses:
  CARL F. GEYER,
  JNO. J. BONNER.